(12) United States Patent
Kim et al.

(10) Patent No.: US 12,511,439 B2
(45) Date of Patent: Dec. 30, 2025

(54) DIGITAL FORENSIC IMAGE VERIFICATION SYSTEM

(71) Applicants: 4DREAM CO., LTD., Andong-si (KR); Hanwha Techwin Co., Ltd., Seongnam-si (KR)

(72) Inventors: Won-Kug Kim, Andong-si (KR); Jin-Kyo Shin, Andong-si (KR)

(73) Assignees: 4DREAM CO., LTD., Andong-si (KR); Hanwha Vision Co., Seongnam-si (KR)

( * ) Notice: Subject to any disclaimer, the term of this patent is extended or adjusted under 35 U.S.C. 154(b) by 311 days.

(21) Appl. No.: 17/985,955

(22) Filed: Nov. 14, 2022

(65) Prior Publication Data

US 2023/0074748 A1    Mar. 9, 2023

Related U.S. Application Data

(63) Continuation of application No. 16/062,523, filed as application No. PCT/KR2016/014561 on Dec. 13, 2016, now abandoned.

(30) Foreign Application Priority Data

Dec. 14, 2015   (KR) .................. 10-2015-0178101
Dec. 12, 2016   (KR) .................. 10-2016-0168271

(51) Int. Cl.
G06F 21/64    (2013.01)
G06F 11/14    (2006.01)
G06V 40/10    (2022.01)
G06V 40/50    (2022.01)
H04L 9/32     (2006.01)
H04N 5/77     (2006.01)
(Continued)

(52) U.S. Cl.
CPC .......... G06F 21/64 (2013.01); G06F 11/1469 (2013.01); G06V 40/50 (2022.01); H04L 9/3242 (2013.01); H04L 9/3252 (2013.01); H04N 5/77 (2013.01); H04N 5/913 (2013.01); H04N 7/167 (2013.01); H04N 21/235 (2013.01); *G06V 40/155* (2022.01)

(58) Field of Classification Search
CPC . G06F 21/64; G06F 11/1469; G06K 9/00926; G06K 2009/00946; H04L 9/3242; H04L 9/3252; H04N 5/77; H04N 5/913; H04N 7/167; H04N 21/235
USPC ........................................................ 713/168
See application file for complete search history.

(56) References Cited

U.S. PATENT DOCUMENTS

| | | | | |
|---|---|---|---|---|
| 2011/0199478 | A1* | 8/2011 | Ito ......................... | H04N 7/185 348/92 |
| 2015/0161464 | A1* | 6/2015 | Hansen ................. | G06V 20/56 382/105 |
| 2015/0334257 | A1* | 11/2015 | Woods ............... | H04N 1/00307 348/207.1 |

* cited by examiner

*Primary Examiner* — Moeen Khan
(74) *Attorney, Agent, or Firm* — McLean IP Global; Jason Y. Pahng (57) ABSTRACT

A digital forensic image verification system according to an embodiment of the present disclosure includes an imaging device having a imaging unit configured to produce an image, a first hash value generator configured to generate a first hash value for the image, and a transmitting unit configured to transmit the image and the first hash value; and an image storage device having a receiving unit configured to receive the image and the first hash value from the imaging device, a second hash value generator configured to generate a second hash value for the image, and a controller configured to compare the first hash value and the second hash value with each other.

4 Claims, 4 Drawing Sheets

(51) Int. Cl.
*H04N 5/913* (2006.01)
*H04N 7/167* (2011.01)
*H04N 21/235* (2011.01)

DIGITAL FORENSIC IMAGE VERIFICATION SYSTEM

This application is a continuation of U.S. application Ser. No. 16/625,523, filed on Jun. 14, 2018, which is a national stage application, filed under 35 U.S.C § 371, of international patent application number PCT/KR2016/014561, filed on Dec. 13, 2016, which is hereby incorporated by reference in its entirety. In addition, this application claims priority from and the benefit of Korean Patent Application No. 10-2015-0178101, filed on Dec. 14, 2015, and Korean Patent Application No. 10-2016-0168271, filed on Dec. 12, 2016, in the Korean Intellectual Property Office, both of which are hereby incorporated by reference for all purposes as if fully set forth herein.

TECHNICAL FIELD

The present disclosure relates to a digital forensic image verification system, and more particularly, to a digital forensic image verification system in which an imaging device which captures an image generates a first hash value and transmits it to an image storage device, and the image storage device generates a second hash value and verifies whether the image has been forged or altered by comparing the first hash value and the second hash value with each other.

BACKGROUND ART

Digital forensics is a branch of security service which is used to verify a fact occurring, based on digital materials stored in a digital medium such as a computer, and is related to collecting and analyzing scientific evidence used in a criminal investigation.

As described above, in digital forensics, evidence cannot be used when it is not objectively proved that the evidence has not been forged or altered in collecting and analyzing the evidence. Thus, techniques for verifying that an evidence material is a clear image evidence material have been developed.

In the past time, forgery/alteration verification is performed such that an imaging device simply provides sound and images to an image storage device and a system collects the sound and the images from the image storage device and verifies whether the sound and the images have been forged or altered. Thus, it is difficult to verify the authenticity of the sound and the images during the transfer of the sound and the images from the image storage device to the system.

Furthermore, there is no digital forensic technology whereby authenticity is provided to verify forgery/alteration and conduct a backup using hash values by an imaging device and an image storage device.

As the prior art related to forgery/alteration, in Korean Patent No. 10-0794890 disclosing an information processing method, a forgery/alteration verification method and apparatus, and a storage medium therefor, an obtaining means for obtaining, from an external device, secret data obtained by performing an arithmetic operation on device unique information and a secret key or seed information which is secretly managed in the external device, a retention means for obtaining key data on the basis of the secret data obtained from the obtaining means and secretly retaining the key data, a generation means for generating authentication data on the basis of data to be protected and the key data retained in the retention means, and a provision means for providing the device unique information and the authentication data, together with the data to be protected are provided as information processing devices for providing data including information for detecting forgery/alteration.

As described above, according to the prior art, forgery/alteration verification can be verified but is not performed between an imaging device and an image storage device.

As the prior art related to authenticity and integrity, Korean Patent No. 10-0826266 discloses an electronic document management system for providing authenticity and integrity and a method of managing the same. The electronic document management system includes a scan station configured to convert a paper document into an image and convert the image into a submission information package so as to maintain authenticity, integrity, and reliability of the image, a transmission means configured to apply a security protocol to the submission information package from the scan station and transmit the submission information package to an electronic document management server, and the electronic document management server configured to verify the submission information package, convert the verified submission information package into an archival information package, store the archival information package, and produces a distribution information package by applying distribution meta data and a security package to electronic information when a user searches for the electronic device and wants to view the electronic information.

The prior art described above relates to authenticity and integrity but does not relate to authenticity and integrity verified between an imaging device and an image storage device.

DETAILED DESCRIPTION OF THE INVENTION

Technical Problem

To address the aforementioned problems, the present disclosure is directed to verifying whether an image has been forged or altered by generating a first hash value by an imaging device, generating a second hash value by an image storage device, and determining whether the first hash value and the second hash value are the same.

The present disclosure is also directed to greatly decreasing load applied in generating a first hash value by an imaging device, when whether an image has been forged or altered is verified by generating the first hash value by the imaging device, generating a second hash value by an image storage device, and determining whether the first hash value and the second hash value are the same.

The present disclosure is also directed to greatly decreasing load applied in generating a second hash value by an image storage device, when whether an image has been forged or altered is verified by generating a first hash value by an imaging device, generating the second hash value by the image storage device, and determining whether the first hash value and the second hash value are the same.

The present disclosure is also directed to obtaining an image having the same authenticity as an original image by verifying whether the image has been forged or altered by generating a first hash value by an imaging device, generating a second hash value by an image storage device, and determining whether the first hash value and the second hash value are the same.

Technical Solution

According to an embodiment of the present disclosure, a digital forensic image verification system includes an imaging device having a imaging unit configured to produce an image, a first hash value generator configured to generate a first hash value for the image, and a transmitting unit configured to transmit the image and the first hash value; and an image storage device having a receiving unit configured to receive the image and the first hash value from the imaging device, a second hash value generator configured to generate a second hash value for the image, and a controller configured to compare the first hash value and the second hash value with each other.

In one embodiment, the imaging device may further include a muxing unit configured to mux the first hash value and the image corresponding to the first hash value.

In one embodiment, the transmitting unit of the imaging device may be configured to transmit the image and the first hash value muxed by the muxing unit.

In one embodiment, the receiving unit of the image storage device may be configured to receive the image and the first hash value muxed by the imaging device.

In one embodiment, the image storage device may further include a demuxing unit configured to demux the muxed image and first hash value.

In one embodiment, the image storage device may further include a storage unit configured to divide and store the demuxed image and first hash value.

In one embodiment, the second hash value generator of the image storage device may be included in the controller.

According to another embodiment of the present disclosure, a digital forensic image verification system includes an imaging device having a imaging unit configured to produce an image, a first hash value generator configured to generate a first hash value for a part of the image produced by the imaging unit, and a transmitting unit configured to transmit the image and the first hash value; and an image storage device having a receiving unit configured the image and the first hash value from the imaging device, a second hash value generator configured to generate a second hash value for the image, and a controller configured to compare the first hash value and the second hash value with each other.

In one embodiment, the first hash value generator may be configured to generate the first hash value for some of frames consisting of the image produced by the imaging unit.

In one embodiment, the frames for which the first hash value is generated among the frames consisting of the image produced by the imaging unit may include frames arranged at intervals of a certain order among frames arranged in a sequential order to form the image.

In one embodiment, the frames for which the first hash value is generated among the frames consisting of the image produced by the imaging unit may include frames arranged at certain time intervals among frames arranged in a sequential order to form the image.

In one embodiment, the frames for which the first hash value is generated among the frames consisting of the image produced by the imaging unit may include frames corresponding to intervals of a certain data size among frames arranged in a sequential order to form the image.

In one embodiment, the first hash value generator may be configured to generate the first hash value for some regions of the image produced by the imaging unit.

In one embodiment, the first hash value generator may be configured to generate the first hash value in units of images produced by the imaging unit.

According to another embodiment of the present disclosure, a digital forensic image verification system includes an imaging device having a imaging unit configured to generate images, a first hash value generator configured to generate a first hash value for the images, and a transmitting unit configured to transmit the images and the first hash value; and an image storage device having a receiving unit configured to receive the images and the first hash value from the imaging device, a second hash value generator configured to generate a second hash value for some of the images received by the receiving unit, and a controller configured to compare the first hash value and the second hash value with each other.

In one embodiment, the second hash value generator may be configured to generate the second hash value for some images backed up among the images received by the receiving unit.

In one embodiment, the first hash value generator may be configured to generate the first hash value for some of the images produced by the imaging unit, and the second hash value generator may be configured to generate the second hash value for the images for which the first hash value is generated among the images produced by the receiving unit.

In one embodiment, the second hash value generator may be configured to generate the second hash value for images requested to be transmitted to the outside among the images received by the receiving unit.

According to another embodiment of the present disclosure, a digital forensic image verification system includes an imaging device configured to generate an image; a first hash value generation device configured to generate a first hash value for the image received from the imaging device; and an image storage device having a receiving unit configured to receive the image and the first hash value from the first hash value generation device; a second hash value generator configured to generate a second hash value for the image; and a controller configured to compare the first hash value and the second hash value with each other.

According to another embodiment of the present disclosure, a digital forensic image verification system includes an imaging device having a imaging unit configured to generate an image, a first hash value generator configured to generate a first hash value for the image, and a transmitting unit configured to transmit the image and the first hash value; a second hash value generation device configured to generate a second hash value for the image received from the imaging device; and an image storage device having a receiving unit configured to receive the image and the first hash value from the imaging device, and receive the second hash value from the second hash value generation device; and a controller configured to compare the first hash value and the second hash value with each other.

Advantageous Effects of the Invention

As described above, according to the present disclosure, whether an image received by an image storage device has been forged or altered may be verified using a first hash value for the image generated by an imaging device and a second hash value for the image generated by the image storage device.

According to the present disclosure, a load applied in generating a first hash value by an imaging device may be greatly decreased, when whether an image received by an image storage device has been forged or altered is verified using the first hash value for the image generated by the imaging device and a second hash value for the image generated by the image storage device.

According to the present disclosure, a load applied in generating a second hash value by an image storage device may be greatly decreased, when whether an image received by the image storage device has been forged or altered is verified using a first hash value for the image generated by an imaging device and the second hash value for the image generated by the image storage device.

According to the present disclosure, an image having the same authenticity as an original image may be obtained by verifying whether an image received by an image storage device has been forged or altered by using a first hash value for the image generated by an imaging device and a second hash value for the image generated by the image storage device.

MODE OF THE INVENTION

Hereinafter, a structure and effects of an embodiment of the present disclosure will be described with reference to the accompanying drawings.

First Embodiment

Figure 1:
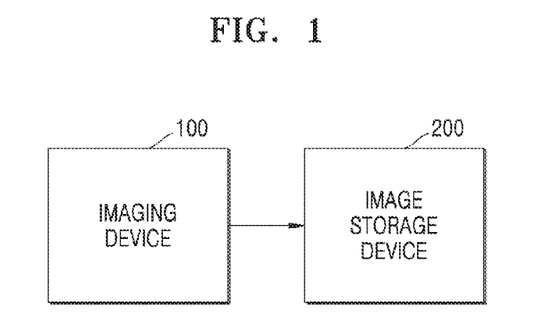
FIG. 1 is a block diagram of a digital forensic image verification system according to an embodiment of the present disclosure.

FIG. 1 is a block diagram of a digital forensic image verification system according to an embodiment of the present disclosure. The digital forensic image verification system includes an imaging device 100 and an image storage device 200.

Figure 2:
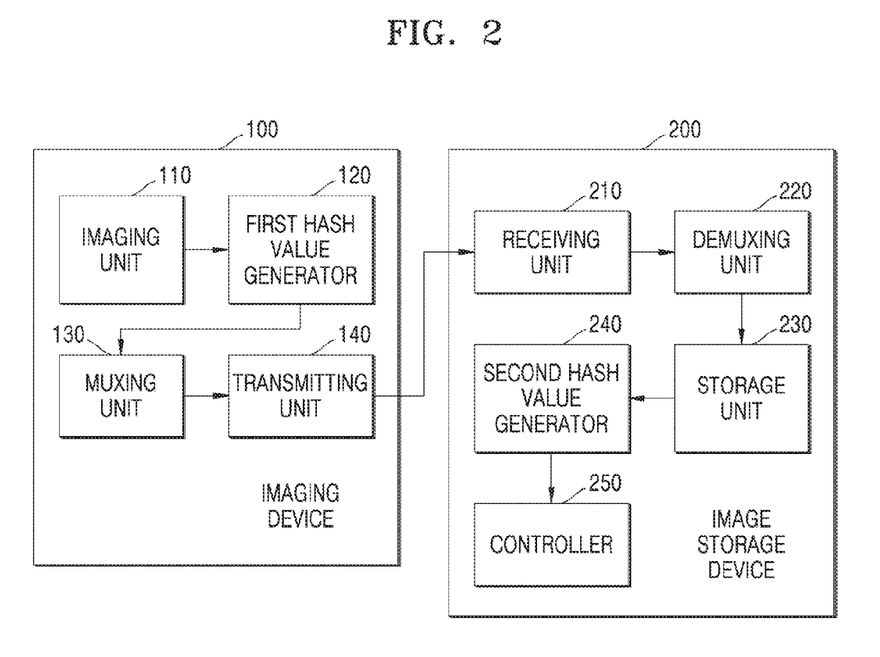
FIG. 2 is a detailed block diagram of a digital forensic image verification system according to an embodiment of the present disclosure.

In more detail, the imaging device 100 includes an imaging unit 110, a first hash value generator 120, a muxing unit 130, and a transmitting unit 140 as illustrated in FIG. 2.

The imaging unit 110 of the imaging device 100 produces sound and an image.

The first hash value generator 120 of the imaging device 100 generates a first hash value for the sound and the image at intervals of a certain time.

Figure 3:
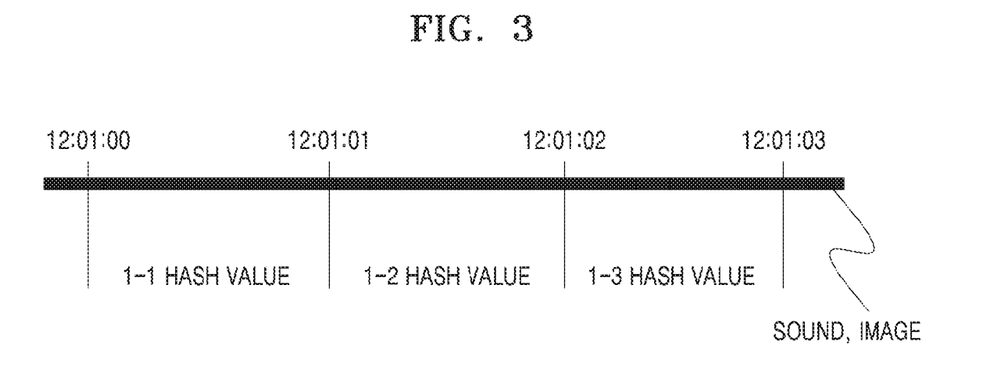
FIG. 3 is a diagram illustrating generating a first hash value according to an embodiment of the present disclosure.

For example, as illustrated in FIG. 3, when it is assumed that sound and an image are produced from 12:01:00 to 12:01:03 and the certain time is 1 second, the first hash value generator 120 may generate a 1-1 hash value from 12:01:00 to 12:01:01, a 1-2 hash value from 12:01:01 to 12:01:02, and a 1-3 hash value from 12:01:02 to 12:01:03.

Since a hash value for sound and an image received from 12:01:00 to 12:01:01 is changed in units of frames, the 1-1 hash value is generated by combining different hash values for the frames at the intervals of the certain time to prove authenticity.

Similarly, the 1-2 and 1-3 hash values are generated according to the same concept as the 1-1 hash value.

Accordingly, different first hash values are generated at the intervals of the certain time.

The muxing unit 130 of the imaging device 100 muxes the different first hash values generated at the intervals of the certain time and sound and images corresponding to the intervals of the certain time.

Figure 4:
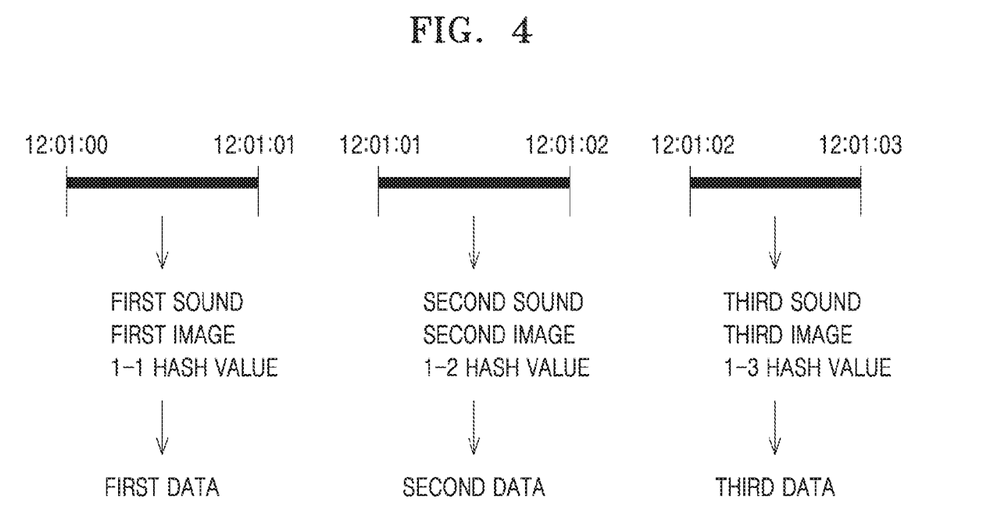
FIG. 4 is a diagram illustrating performing muxing according to an embodiment of the present disclosure.

For example, as illustrated in FIG. 4, the muxing unit 130 may mux first sound, a first image, and the 1-1 hash value generated from 12:01:00 to 12:01:01, mux second sound, a second image, and the 1-2 hash value generated from 12:01:01 to 12:01:02, and mux third sound, a third image, and the 1-3 hash value generated from 12:01:02 to 12:01:03.

The transmitting unit 140 of the imaging device 100 transmits the muxed sound, images, and first hash values.

For example, the transmitting unit 140 transmits the first, second, and third data muxed as illustrated in FIG. 4 to the image storage device 200. To help understand the present disclosure, the first, second, and third data are illustrated separately in FIG. 4 but are continuously transmitted.

As illustrated in FIG. 2, the image storage device 200 may include a receiving unit 210, a demuxing unit 220, a storage unit 230, a second hash value generator 240, and a controller 250.

The receiving unit 210 of the image storage device 200 receives the muxed sound, images, and first hash values.

For example, the receiving unit 210 receives the muxed the first, second, and third data as illustrated in FIG. 4.

The demuxing unit 220 of the image storage device 200 demuxes the received sound, images, and first hash values.

The storage unit 230 of the image storage device 200 divides and stores the demuxed sound, images, and first hash values.

That is, the storage unit 230 divides and stores the demuxed sound, images, and first hash values such that the sound and images are provided when they are backed up and each of the first hash value is compared with a generated second hash value when each of the first hash values is backed up.

The second hash value generator 240 of the image storage device 200 generates second hash values for the sound and images stored in the storage unit 230 at intervals of the certain time when the stored sound and images are backed up.

Figure 5:
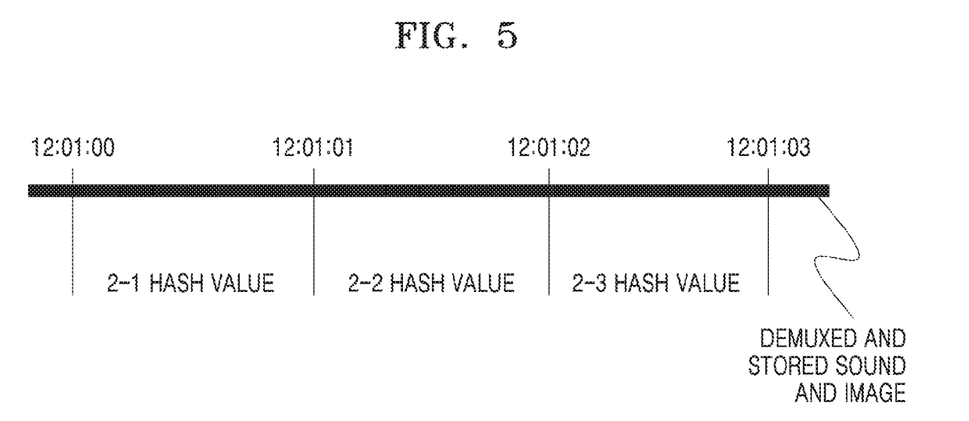
FIG. 5 is a diagram illustrating performing demuxing according to an embodiment of the present disclosure.

For example, when the imaging device 100 generates 1-1, 1-2, and 1-3 hash values for sound and images from 12:01:00 to 12:01:03 as illustrated in FIG. 3, the second hash value generator 240 generates 2-1, 2-2, and 2-3 hash values for demuxed sound and images from 12:01:00 to 12:01:03 as illustrated in FIG. 5.

Thus, the 2-1 hash value is generated at the same time as the 1-1 hash value is generated, the 2-2 hash value is generated at the same time as the 1-2 hash value is generated, and the 2-3 hash value is generated at the same time as the 1-3 hash value is generated.

Similar to the first hash value, the 2-1 hash value is generated by combining different hash values for frames to prove authenticity, since different hash values are generated for sound and images stored in the storage unit 230 from 12:01:00 to 12:01:01.

Similarly, the 2-2 and 2-3 hash values are generated according to the same concept as the 2-1 hash value.

Accordingly, different second hash values are generated at intervals of the certain time and are compared with the first hash values at the same intervals of the certain time.

That is, the second hash value generator 240 generates different second hash values for the demuxed sound and images at intervals of a certain time to be compared with the first hash values generated for the sound and images by the imaging device 100 at the same intervals of the certain time.

The controller 250 of the image storage device 200 compares the stored different first hash values and the generated different second hash values with each other at the same intervals of the certain time when backup is performed.

For example, as illustrated in FIGS. 3 and 5, when the 1-1 hash value and the 2-1 hash value from 12:01:00 to 12:01:01 are the same, the 1-2 hash value and the 2-2 hash value from 12:01:01 to 12:01:02 are different, and the 1-3 hash value and the 2-3 hash value from 12:01:02 to 12:01:03 are the same, the controller 250 may determine that the sound and the images have been forged or altered due to an external intrusion, since it is proved that there is no change in the hash values from 12:01:00 to 12:01:01 and from 12:01:02 to 12:01:03 and thus they are the same but there is a change in the hash values from 12:01:01 to 12:01:02.

Thus, according to the present disclosure, authenticity may be verified using hash values and the hash values may be compared only when backup is performed by the image storage device 200, thereby improving the CPU performance of the image storage device 200.

If the first hash value generator 120 of the imaging device 100 generates and stores data regarding a place in which the imaging device 100 is installed, the first hash value generator 120 may provide the data regarding the place when backup is performed by the image storage device 200.

That is, when the data regarding the place is generated by the first hash value generator 120 in connection with a positioning module, such as a global positioning system (GPS) or an Internet protocol (IP) and is stored in the image storage device 200, the data regarding the place is stored in another storage device to verify authenticity when backup is performed.

For example, the imaging device 100 is installed in a place appropriate for a purpose to capture sound and an image, and data regarding the place is generated by the first hash value generator 120 and transmitted to the image storage device 200 to prevent sound and an image captured by the imaging device 100 from being captured by another imaging device by zooming and illegally used.

Furthermore, if the first hash value generator 120 of the imaging device 100 generates identification number data identifying whether the imaging device 100 is authorized, the identification number data may be provided when backup is performed by the image storage device 200.

That is, when the identification number data is generated by the first hash value generator 120 such that a user may identify whether the imaging device 100 is authorized and is stored in the image storage device 200, the identification number data is stored in another storage device to verify authenticity when backup is performed.

For example, since sound and images captured by the imaging device 100 are available as evidence only when the imaging device 100 is authorized and sound and images captured by an unauthorized device are unavailable as evidence, the identification number data of the authorized imaging device 100 is generated by the first hash value generator 120 and is transmitted to the image storage device 200.

Furthermore, if the first hash value generator 120 of the imaging device 100 generates installation purpose attribute data regarding a purpose of installation of the imaging device 100, the installation purpose attribute data may be provided when backup is performed by the image storage device 200.

That is, when the installation purpose attribute data is generated by the first hash value generator 120 according to a purpose of installation, e.g., a security purpose, a parking surveillance purpose, a fly-tipping prevention purpose, a children protection zone surveillance purpose, etc., and is stored in the image storage device 200, the installation purpose attribute data is stored in another storage device to verify authenticity of the purpose of installation when backup is performed.

In addition, if the first hash value generator 120 of the imaging device 100 generates time data managed by the imaging device 100 and imaging device attribute data including a manufacturer name, a model name, a serial number, an installation purpose, a MAC address, and an IP address, the time data and the imaging device attribute data may be provided when backup is performed by the image storage device 200.

That is, the time data and the imaging device attribute data include information regarding a time zone of the imaging device 100 which is being operated and attributes of the imaging device 100, i.e., the manufacturer name, the model name, the serial number, the installation purpose, the MAC address, and the IP address, and are provided during performing of backup, so that sound or an image obtained or fabricated by an unauthorized imaging device may be prevented from being used as evidence, thereby verifying that an image produced by the imaging device 100 is available as evidence according to forensic requirements.

In particular, it is preferable that the image storage device 200 may be configured such that the second hash value generator 240 is included in the controller 250.

That is, the hash value generator 240 generates a second hash value only when backup is performed and thus the controller 250 may generate the second hash value and directly compare it with the first hash value in a software manner.

Accordingly, according to the present disclosure, sound and an image generated by the imaging device 100 may be verified to be originals even when the sound and the image are stored in the image storage device 200 and partially backed up in another storage device.

Second Embodiment

Figure 6:
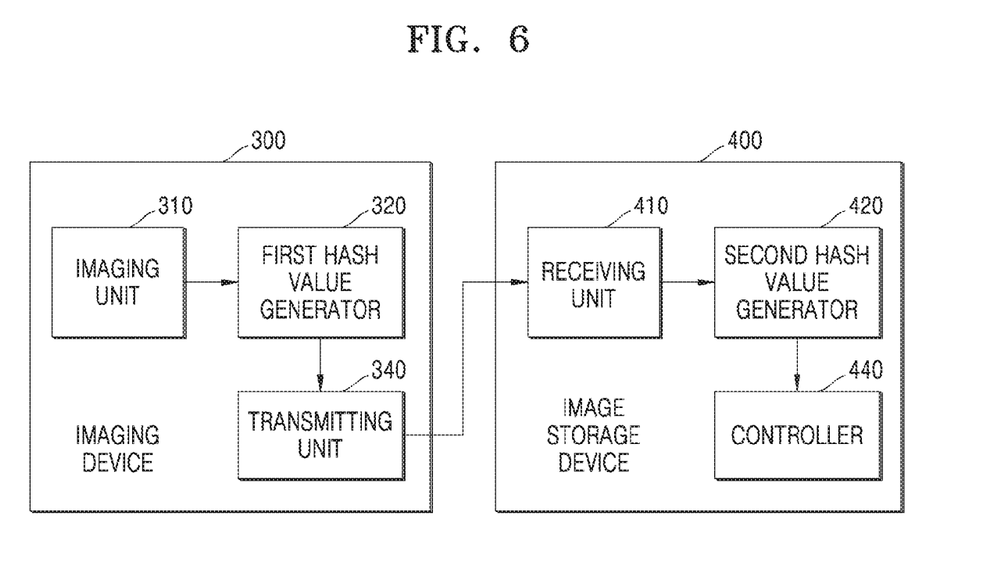
FIG. 6 is a detailed block diagram of a digital forensic image verification system according to another embodiment of the present disclosure.

Another embodiment of the present disclosure will be described with reference to FIG. 6. The digital forensic image verification system according to the present embodiment includes an imaging device 300 and an image storage device 400.

The imaging device 300 includes an imaging unit 310, a first hash value generator 320, and a transmitting unit 340.

The imaging unit 310 produces an image. However, embodiments are not limited thereto and the imaging unit 310 may produce sound together with the image.

The first hash value generator 320 generates a first hash value for a part of the image produced by the imaging unit 310. Thus, load applied to the first hash value generator 320 may be more reduced than when a first hash value for the entire image produced by the imaging unit 310 is generated.

As a method of generating a first hash value for a part of the image, which is produced by the imaging unit 310, by the first hash value generator 320, the first hash value generator 320 may generate a first hash value for some frames among a number of frames consisting of the image produced by the imaging unit 310.

For example, the frames for which the first hash value is generated by the first hash value generator 320 among the large number of frames consisting of the image produced by the imaging unit 310 may include frames arranged at intervals of a certain order, e.g., a first frame, a twenty-fifth frame, and a forty-ninth frame, or frames arranged at certain time intervals, e.g., at intervals of one second, one minute, or ten minutes, among frames arranged in a sequential order to form the image. Alternatively, the frames for which the first hash value is generated by the first hash value generator 320 among the large number of frames consisting of the image produced by the imaging unit 310 may include frames corresponding to intervals of a certain data size, e.g., 10 KB, 100 KB or 1 GB, among the frames arranged in the sequential order to form the image.

As another method of generating a first hash value for a part of the image, which is produced by the imaging unit 310, by the first hash value generator 320, the first hash value generator 320 may generate a first hash value for some regions, e.g., front and rear regions, of the image produced by the imaging unit 310.

As another method of generating a first hash value for some of images, which are produced by the imaging unit 310, by the first hash value generator 320, the first hash value generator 320 may generate a first hash value in units of the images produced by the imaging unit 310 as individual image data files.

The transmitting unit 340 transmits the image and the first hash value.

The image storage device 400 includes a receiving unit 410, a second hash value generator 420, and a controller 440.

The receiving unit 410 receives the image and the first hash value from the imaging device 300.

The second hash value generator 420 generates a second hash value for the image received by the receiving unit 410.

The controller 440 compares the first hash value and the second hash value with each other. Thus, the controller 440 may determine whether the first hash value and the second hash value are the same to determine whether the image received by the receiving unit 410 has been forged or altered.

Third Embodiment

A digital forensic image verification system according to the present embodiment is differentiated from the digital forensic image verification system according to the second embodiment, in terms of a first hash value generator and a second hash value generator. The present embodiment will be described with reference to FIG. 6. In the following description regarding the present embodiment, the first hash value generator and the second hash value generator are assigned the same reference numerals as those according to the second embodiment.

The digital forensic image verification system according to the present embodiment includes an imaging device 300 and an image storage device 400.

The imaging device 300 includes an imaging unit 310, a first hash value generator 320, and a transmitting unit 340. The image storage device 400 includes a receiving unit 410, a second hash value generator 420, and a controller 440.

The imaging unit 310 produces an image. However, embodiments are not limited thereto and the imaging unit 310 may produce sound together with the image.

The first hash value generator 320 generates a first hash value for the image produced by the imaging unit 310.

The transmitting unit 340 transmits the image and the first hash value.

The image storage device 400 includes the receiving unit 410, the second hash value generator 420, and a controller 440.

The receiving unit 410 receives the image and the first hash value from the imaging device 300.

The second hash value generator 420 generates a second hash value for some of images received by the receiving unit 410. Thus, load applied to the second hash value generator 420 may be more reduced than when a second hash value for all the images received by the receiving unit is generated.

The second hash value generator 420 may generate a second hash value for some of the images received by the receiving unit 410 in various ways. For example, the second hash value generator 420 may generate a second hash value for images backed up among the images received by the receiving unit 410. When the first hash value generator 320 generates a first hash value for some of images produced by the imaging unit 310, the second hash value generator 420 may generate a second hash value for the images for which the first hash value is generated among the images received by the receiving unit 410. Furthermore, the second hash value generator 420 may generate a second hash value for images requested to be transmitted to the outside among the images received by the receiving unit 410.

The controller 440 compares the first hash value and the second hash value to each other. Thus, the controller 440 may determine whether the first hash value and the second hash value are the same to determine whether the images received by the receiving unit 410 have been forged or altered.

Fourth Embodiment

Figure 7:
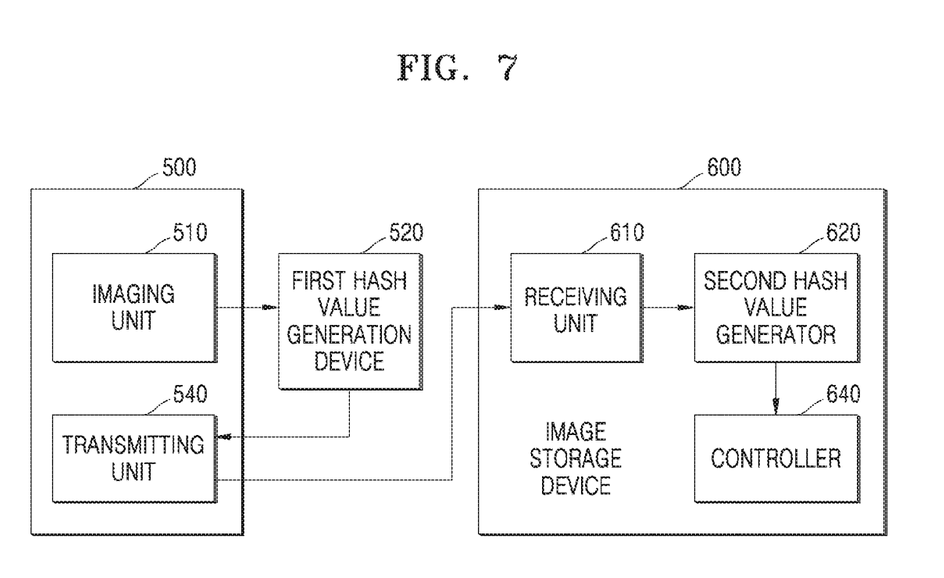
FIG. 7 is a detailed block diagram of a digital forensic image verification system according to another embodiment of the present disclosure.

A fourth embodiment will be described with reference to FIG. 7. A digital forensic image verification system according to the present embodiment includes an imaging device 500 and an image storage device 600, and further incudes a first hash value generation device 520 configured to generate a first hash value.

The imaging device 500 includes an imaging unit 510 configured to produce an image, and a transmitting unit 540 configured to transmit the image and the first hash value received from the first hash value generation device 520.

The first hash value generation device 520 receives the image from the imaging device 500 which generates the image, generates a first hash value for the received image, and transmits the first hash value to the transmitting unit 540 of the imaging device 500. Thus, load to be applied to the imaging device 500 when the first hash value is generated may be completely removed, compared to when the imaging device 500 generates a first hash value for the image produced by the imaging device 500.

The image storage device 600 includes a receiving unit 610 configured to receive the image and the first hash value from the first hash value generation device 520, a second hash value generator 620 configured to generate a second hash value for the image, and a controller 640 configured to compare the first hash value and the second hash value with each other, and is substantially the same as the digital forensic image verification system according to the second embodiment.

Embodiment 5

Figure 8:
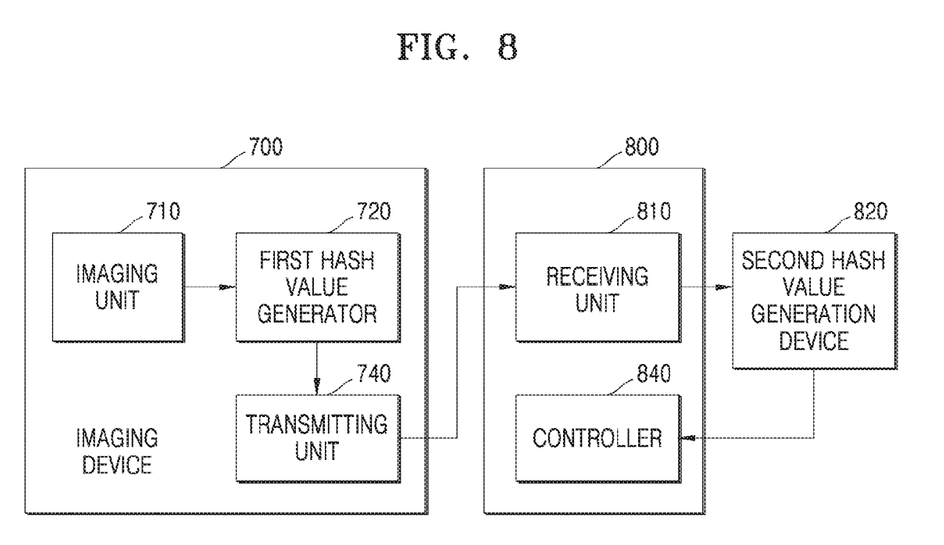
FIG. 8 is a detailed block diagram of a digital forensic image verification system according to another embodiment of the present disclosure.

A fifth embodiment will be described with reference to FIG. 8. A digital forensic image verification system according to the present embodiment includes an imaging device 700 and an image storage device 800, and further includes a second hash value generation device 820 configured to generate a second hash value.

The imaging device 700 includes an imaging unit 710 configured to produce an image, a first hash value generator 720 configured to generate a first hash value for the image, and a transmitting unit 740 configured to transmit the image and the first hash value, and is substantially the same as the digital forensic image verification system according to the second embodiment.

The second hash value generation device 820 generates a second hash value for the image received from the imaging device 700 and transmits the second hash value to the image storage device 800. Thus, load to be applied to the image storage device 800 when the second hash value is generated may be completely removed, compared to when the second hash value is generated by the image storage device 800.

The image storage device 800 includes a receiving unit 810 configured to receive the image and the first hash value from the imaging device 700 and receive the second hash value from the second hash value generation device 820, and a controller 840 configured to compare the first hash value and the second hash value with each other.

Exemplary embodiments according to the present disclosure described above are set forth in the drawings and the detailed description, and the terminology used herein are merely provided to describe the present disclosure and should not be understood as limiting the meaning or the scope of the present disclosure defined in the claims.

Accordingly, it will be apparent to those of ordinary skill in the art that various changes may be made in the embodiments, and other embodiments equivalent thereto may be implemented. The scope of the present disclosure should be defined by the technical ideal defined in the claims.

What is claimed is:

1. A digital forensic image verification system comprising:
   an imaging device comprising at least one hardware processor to implement:
     an imaging unit configured to generate images;
     a first hash value generator configured to generate a first hash value for at least one of the images; and
     a transmitting unit configured to transmit the images and the first hash value; and
   an image storage device comprises at least one hardware processor to implement:
     a receiving unit configured to receive the images and the first hash value from the imaging device;
     the image storage device configured to determine whether a request has been received for one or more of the received images, from the imaging device, to be transmitted to the outside of the digital forensic image verification system;
     a second hash value generator configured to generate a second hash value for the image for which the determination has been made that the request for the image to be transmitted, to the outside of the digital forensic image verification system, has been received;
   a controller configured to compare the first hash value generated in the imaging device and the second hash value generated in the image storage device with each other, and transmits the image to the outside of digital forensic image verification system for backup, based on a determination that the first hash value and the second hash value are the same; and
   wherein the first hash value generator is configured to generate the first hash value for some frames among the image produced by the imaging unit, wherein the frames for which the first hash value is generated among the frames of the image produced by the imaging unit are arranged at intervals of a sequential order.

2. A digital forensic image verification system comprising:
   an imaging device comprising at least one hardware processor to implement:
     an imaging unit configured to generate images;
     a first hash value generator configured to generate a first hash value for at least one of the images; and
     a transmitting unit configured to transmit the images and the first hash value; and
   an image storage device comprises at least one hardware processor to implement:
     a receiving unit configured to receive the images and the first hash value from the imaging device;
     the image storage device configured to determine whether a request has been received for one or more of the received images, from the imaging device, to be transmitted to the outside of the digital forensic image verification system;
     a second hash value generator configured to generate a second hash value for the image for which the determination has been made that the request for the image to be transmitted, to the outside of the digital forensic image verification system, has been received;
   a controller configured to compare the first hash value generated in the imaging device and the second hash value generated in the image storage device with each other, and transmits the image to the outside of digital forensic image verification system for backup, based on a determination that the first hash value and the second hash value are the same; and
   wherein the first hash value generator is configured to generate the first hash value for some frames among the image produced by the imaging unit, wherein the frames for which the first hash value is generated among the frames of the image produced by the imaging unit are arranged at certain time intervals.

3. The digital forensic image verification system of claim 2, wherein the first hash value generator is configured to generate the first hash value for some regions of the image produced by the imaging unit.

4. The digital forensic image verification system of claim 2, wherein the first hash value generator is configured to generate the first hash value in units of an images data file produced by the imaging unit.

* * * * *